(12) United States Patent
Adachi (10) Patent No.: US 12,149,674 B2
(45) Date of Patent: Nov. 19, 2024

(54) INFORMATION PROCESSING APPARATUS, INFORMATION PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Daichi Adachi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 717 days.

(21) Appl. No.: 17/175,365

(22) Filed: Feb. 12, 2021

(65) Prior Publication Data

US 2021/0258560 A1 Aug. 19, 2021

(30) Foreign Application Priority Data

Feb. 18, 2020 (JP) ................. 2020-024926

(51) Int. Cl.
  *G06K 9/00* (2022.01)
  *G06F 3/01* (2006.01)
  (Continued)

(52) U.S. Cl.
  CPC .......... *H04N 13/282* (2018.05); *G06F 3/012* (2013.01); *G06F 3/013* (2013.01); *G06T 7/536* (2017.01); *G06T 7/75* (2017.01); *H04N 13/279* (2018.05)

(58) Field of Classification Search
  None
  See application file for complete search history.

(56) References Cited

U.S. PATENT DOCUMENTS

2015/0332505 A1  11/2015  Wang
2016/0055676 A1  2/2016  Kasahara
(Continued)

FOREIGN PATENT DOCUMENTS

CN   109816766 A   5/2019
JP   2013225903 A  10/2013
(Continued)

OTHER PUBLICATIONS

Li, et al., "A Novel Method of Depth-image-Based View Synthesis", Department of Electronic Science and Technology, University of Science and Technology of China, China, Sep. 15, 2010.

*Primary Examiner* — Wei Wen Yang
(74) *Attorney, Agent, or Firm* — Canon U.S.A., Inc. IP Division (57) ABSTRACT

An information processing apparatus obtains object information representing a position and a shape of an object in an image capturing region of which image is captured from different directions by a plurality of image capturing apparatuses, discriminates between a visible region that can be seen from a specific position in the image capturing region and an occluded region that cannot be seen from the specific position due to occlusion by the object based on the object information, and generates a virtual viewpoint image that displays information based on a result of the discrimination, the virtual viewpoint image being based on image data based on image capturing by the plurality of image capturing apparatuses and virtual viewpoint information indicating a position and a direction of a virtual viewpoint.

7 Claims, 8 Drawing Sheets

(51) Int. Cl.
   *G06T 7/536*  (2017.01)
   *G06T 7/73*   (2017.01)
   *H04N 13/279* (2018.01)
   *H04N 13/282* (2018.01)

(56) References Cited

U.S. PATENT DOCUMENTS

| | | | |
|---|---|---|---|
| 2018/0063514 | A1 | 3/2018 | Mizuno |
| 2018/0144447 | A1* | 5/2018 | Tate ................. G06T 5/003 |
| 2019/0158802 | A1 | 5/2019 | Higuchi |
| 2021/0225065 | A1* | 7/2021 | Holzer ............... H04N 13/282 |

FOREIGN PATENT DOCUMENTS

| | | | |
|---|---|---|---|
| JP | 6555513 | B2 | 8/2019 |
| KR | 20180099534 | A | 9/2018 |
| KR | 20190058337 | A | 5/2019 |

* cited by examiner

INFORMATION PROCESSING APPARATUS, INFORMATION PROCESSING METHOD, AND NON-TRANSITORY COMPUTER-READABLE STORAGE MEDIUM

BACKGROUND

Field of the Disclosure

The present disclosure relates to processing for information obtained by capturing images of an object using a plurality of image capturing apparatuses from a plurality of directions.

Description of the Related Art

There is a technique of synchronously capturing images from multiple viewpoints with a plurality of image capturing apparatuses set at different positions, and generating a virtual viewpoint image in which a viewpoint can be freely changed using a plurality of images obtained though the image capturing. For example, a virtual viewpoint image corresponding to a viewpoint set by a user is generated based on a plurality of captured images of a game, such as soccer and basketball, and thereby the user can watch the game from various viewpoints. A position and a direction of a virtual viewpoint is set according to a position and a direction of a specific object, such as a soccer player and a referee in an image capturing region, and thereby a virtual viewpoint image that reproduces a field of view of the player or the referee can be generated.

Japanese Patent No. 6555513 discusses provision of a video content corresponding to a viewpoint of a specific player using data obtained by capturing images of a soccer game from a plurality of directions. Japanese Patent No. 6555513 further discusses estimating a field of view defined by viewpoint coordinates, a line-of-sight direction, and a viewing angle of another player, and displaying, in the video content, a blind spot region that does not exist in the field of view of another player.

The blind spot region specified by a method discussed in Japanese Patent No. 6555513, however, does not reflect an invisible region occluded by an object in an image capturing region. For example, even if a region is a region near a line-of-sight direction of a player, the player cannot see a region occluded by another player from the player's viewpoint. Thus, even a region not included in the blind spot region displayed in the video content discussed in Japanese Patent No. 6555513 may include a region representing a true blind spot.

SUMMARY

According to an aspect of the present disclosure, a technique is provided which can easily discriminate between a region which can be seen from a specific position and a region which cannot be seen therefrom due to occlusion.

According to one aspect of the present disclosure, there is provided an information processing apparatus comprising: an obtaining unit configured to obtain object information representing a position and a shape of an object in an image capturing region of which image is captured from different directions by a plurality of image capturing apparatuses; a discriminating unit configured to discriminate between a visible region that can be seen from a specific position in the image capturing region and an occluded region that cannot be seen from the specific position due to occlusion by the object based on the object information obtained by the obtaining unit; and a generating unit configured to generate a virtual viewpoint image that displays information based on a result of discrimination by the discriminating unit, the virtual viewpoint image being based on image data based on image capturing by the plurality of image capturing apparatuses and virtual viewpoint information indicating a position and a direction of a virtual viewpoint.

According to another aspect of the present disclosure, there is provided an information processing apparatus comprising: an obtaining unit configured to obtain object information representing a position and a shape of an object in an image capturing region, the object information being generated based on image data obtained by capturing an image of the image capturing region from different directions by a plurality of image capturing apparatuses; a generating unit configured to generate information that can discriminate between a visible region that can be seen from a specific position corresponding to a specified object in the image capturing region and an occluded region that cannot be seen from the specific position due to occlusion by another object based on the object information obtained by the obtaining unit; and an outputting unit configured to output the information generated by the generating unit.

According to another aspect of the present disclosure, there is provided a method for processing information, the method comprising: obtaining object information representing a position and a shape of an object in an image capturing region of which image is captured from different directions by a plurality of image capturing apparatuses; discriminating between a visible region that can be seen from a specific position in the image capturing region and an occluded region that cannot be seen from the specific position due to occlusion by the object based on the object information obtained by the obtaining; and generating a virtual viewpoint image that displays information based on a result of the discriminating, the virtual viewpoint image being based on image data based on image capturing by the plurality of image capturing apparatuses and virtual viewpoint information indicating a position and a direction of a virtual viewpoint.

According to another aspect of the present disclosure, there is provided a method for processing information, the method comprising: obtaining object information representing a position and a shape of an object in an image capturing region, the object information being generated based on image data obtained by capturing an image of the image capturing region from different directions by a plurality of image capturing apparatuses; generating information that can discriminate between a visible region that can be seen from a specific position corresponding to a specified object in the image capturing region and an occluded region that cannot be seen from the specific position due to occlusion by another object based on the object information obtained by the obtaining; and outputting the information generated by the generating.

According to another aspect of the present disclosure, there is provided a non-transitory computer-readable storage medium storing a program for causing a computer to execute a method for processing information, the method comprising: obtaining object information representing a position and a shape of an object in an image capturing region of which image is captured from different directions by a plurality of image capturing apparatuses; discriminating between a visible region that can be seen from a specific position in the image capturing region and an occluded region that cannot be seen from the specific position due to occlusion by the object based on the object information obtained by the obtaining; and generating a virtual viewpoint image that displays information based on a result of the discriminating, the virtual viewpoint image being based on image data based on image capturing by the plurality of image capturing apparatuses and virtual viewpoint information indicating a position and a direction of a virtual viewpoint and displays information based on a result of the discriminating.

According to another aspect of the present disclosure, there is provided a non-transitory computer-readable storage medium storing a program for causing a computer to execute a method for processing information, the method comprising: obtaining object information representing a position and a shape of an object in an image capturing region, the object information being generated based on image data obtained by capturing an image of the image capturing region from different directions by a plurality of image capturing apparatuses; generating information that can discriminate between a visible region that can be seen from a specific position corresponding to a specified object in the image capturing region and an occluded region that cannot be seen from the specific position due to occlusion by another object based on the object information obtained by the obtaining; and outputting the information generated by the generating.

Further features of the present disclosure will become apparent from the following description of exemplary embodiments with reference to the attached drawings.

DESCRIPTION OF THE EMBODIMENTS

[System Configuration]

Figure 1:
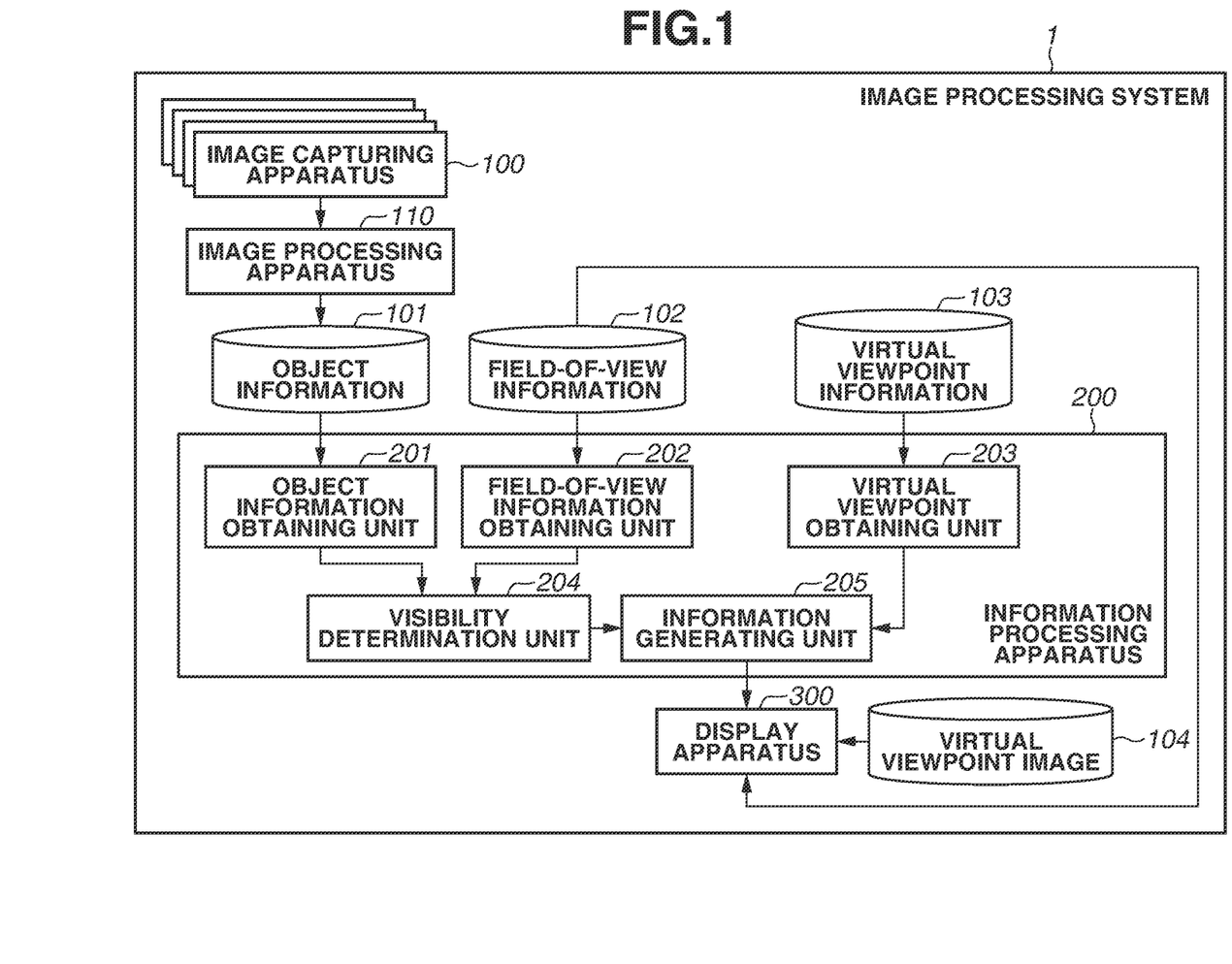
FIG. 1 illustrates an example of a configuration of an image processing system.

FIG. 1 illustrates an example of a configuration of an image processing system 1. The image processing system 1 generates a virtual viewpoint image that represents a view from a specified virtual viewpoint. The image processing system 1 generates the virtual viewpoint image based on a plurality of images (multiple viewpoint images) obtained through image capturing by a plurality of image capturing apparatuses, and on the specified virtual viewpoint. The virtual viewpoint image according to the present exemplary embodiment is also referred to as a free viewpoint video. However, the virtual viewpoint image is not limited to an image corresponding to a viewpoint freely (arbitrarily) specified by a user, and includes, for example, an image corresponding to a viewpoint selected by the user from a plurality of candidates. According to the present exemplary embodiment, a case in which the virtual viewpoint is specified by a user operation is mainly described, but the virtual viewpoint may be automatically specified based on, for example, a result of image analysis. Further, according to the present exemplary embodiment, a case in which the virtual viewpoint image is a still image is mainly described, but the virtual viewpoint image may be a moving image. In other words, the image processing system 1 can process both a still image and a moving image. In the following description, a word "image" will be described as including concepts of both a moving image and a still image unless otherwise stated.

The image processing system 1 includes a plurality of image capturing apparatuses 100, an image processing apparatus 110, an information processing apparatus 200, and a display apparatus 300. The plurality of the image capturing apparatuses 100 captures a subject (object) to be captured in an image capturing region from a plurality of directions. The examples of the image capturing region include a stadium where games of soccer and karate are held, and a stage where a concert and a play are performed. According to the present exemplary embodiment, a case is mainly described in which the image capturing region is a soccer stadium. The plurality of the image capturing apparatuses 100 is each set at a different position to surround the image capturing region and captures images in synchronization with each other. The plurality of the image capturing apparatuses 100 may not be set over an entire circumference of the image capturing region and may be set only in a direction of a part of the image capturing region depending on a restriction of a setting location and the like. The number of the image capturing apparatuses is not limited to the example illustrated in FIG. 1. For example, in a case where the image capturing region is a soccer stadium, approximately 30 image capturing apparatuses may be set around the stadium. Further, the image capturing apparatuses having different functions, such as a telephotographic camera and a wide-angle camera, may be set.

Each of the plurality of the image capturing apparatuses 100 according to the present exemplary embodiment is a camera having an independent housing and the camera can capture an image from a single viewpoint. However, the present exemplary embodiment is not limited to this configuration, and two or more image capturing apparatuses may be included in a same housing. For example, a single camera that includes a plurality of lens groups and a plurality of sensors and captures images from a plurality of viewpoints can be set as the plurality of the image capturing apparatuses 100.

The image processing apparatus 110 generates object information 101 based on image data obtained from the plurality of the image capturing apparatuses 100. The object information 101 includes a foreground object, such as a person and a ball, and a background object, such as a stadium and a field, in the image capturing region. The object information 101 represents a three-dimensional position and a three-dimensional shape of each object. The object information 101 of each object may be individually stored, or pieces of the object information 101 of a plurality of objects in the image capturing region may be collectively stored.

The information processing apparatus 200 includes an object information obtaining unit 201 that obtains the object information 101 from the image processing apparatus 110, a field-of-view information obtaining unit 202 that obtains field-of-view information 102, and a virtual viewpoint obtaining unit 203 that obtains virtual viewpoint information 103. The information processing apparatus 200 further includes a visibility determination unit 204 and an information generating unit 205.

The field-of-view information 102 represents a field of view corresponding to a predetermined viewpoint in the image capturing region. The field-of-view information 102 is a reference for visibility determination described below. The field-of-view information 102 includes information indicating a position and a direction (a line-of-sight direction from the position of the viewpoint) of the viewpoint and an angle of view corresponding to a size of the field of view in a horizontal direction and a vertical direction in a three-dimensional space. Contents of the field-of-view information 102 are not limited to the above-described ones. The size of the field of view can be represented by a focal length or a zoom value. Further, the field-of-view information 102 may include information indicating distances from the position of the viewpoint to a near plane and a far plane that are boundaries of the field of view. The field-of-view information 102 may be specified based on a user operation. At least a part of the field-of-view information 102 may be automatically specified. For example, the image processing system 1 may receive a user operation for specifying the position, the direction, and the angle of view of the viewpoint, and generate the field-of-view information 102.

For example, the image processing system 1 may receive a user operation for specifying a specific person as an object in the image capturing region, and generate the field-of-view information 102 of the specified object, such as the field-of-view information 102 representing a field of view of the specific person. In this case, the position of the viewpoint indicated by the field-of-view information 102 corresponds to a position of a head or an eye of the specified object, and a line-of-sight direction indicated by the field-of-view information 102 corresponds to a direction of the head or the eye of the specified object.

The field-of-view information 102 representing a field of view of a person may be generated based on data obtained from a sensor (e.g., motion capture, an electronic compass, and a global positioning system (GPS)) for detecting the position and the direction of the head or the eye of the person. The field-of-view information 102 may be generated based on a result of analyzing the image data obtained from the image capturing apparatus 100 or the object information 101 generated by the image processing apparatus 110. For example, the coordinate position of the head of the person, which is the position of the viewpoint indicated by the field-of-view information 102, may be a three-dimensional coordinate position away from a position of the top of the head, which has been detected by the sensor or through image analysis, by a predetermined distance in a forward and downward direction of the face. Further, for example, the coordinate position of the head may be a three-dimensional coordinate position away from a position of a center of the detected head by a predetermined distance in a forward direction of the face. Furthermore, the coordinate position of the eye of the person as the position of the viewpoint indicated by the field-of-view information 102 may be a three-dimensional coordinate position in a middle of the left eye and the right eye detected by the sensor or through the image analysis. The image processing system 1 may externally obtain the field-of-view information 102.

The virtual viewpoint information 103 indicates a position and a direction (a line-of-sight direction) of a virtual viewpoint corresponding to a virtual viewpoint image. Specifically, the virtual viewpoint information 103 includes a parameter set that includes a parameter representing the position of the virtual viewpoint in the three-dimensional space and a parameter representing a direction of the virtual viewpoint in a pan, tilt, and roll directions. The contents of the virtual viewpoint information 103 are not limited to the above-described information. The parameter set as the virtual viewpoint information 103 may include, for example, a parameter representing a size of the field of view corresponding to the virtual viewpoint, such as a zoom factor and a focal length, and a parameter representing a time. The virtual viewpoint information 103 may be specified based on a user operation, or at least a part of the virtual viewpoint information 103 may be automatically specified. For example, the image processing system 1 may receive a user operation for specifying the position, the direction, and the angle of view of the virtual viewpoint, and generate the virtual viewpoint information 103. The image processing system 1 may externally obtain the virtual viewpoint information 103.

The visibility determination unit 204 performs visibility determination using the object information 101 obtained by the object information obtaining unit 201, the field-of-view information 102 obtained by the field-of-view information obtaining unit 202, and the virtual viewpoint information 103 obtained by the virtual viewpoint obtaining unit 203. The visibility determination performed by the visibility determination unit 204 is processing for discriminating a region that can be seen from a viewpoint indicated by the field-of-view information 102 from a region that cannot be seen from the viewpoint indicated by the field-of-view information 102, in the image capturing region. The information generating unit 205 generates information corresponding to a result of the visibility determination generated by the visibility determination unit 204 and outputs the information to the display apparatus 300. The information generating unit 205 may generate and output information corresponding to the virtual viewpoint using the result of the visibility determination and the virtual viewpoint information 103. The visibility determination processing and the information to be generated by the information generating unit 205 will be described in detail below.

The display apparatus 300 is a computer having a display, and the display apparatus 300 displays the information obtained from the information generating unit 205 in combination with a virtual viewpoint image 104. A computer graphic (CG) representing the field-of-view information 102 may be included in an image to be displayed by the display apparatus 300. The display apparatus 300 may include a visual presentation device, such as a projector, instead of the display.

The virtual viewpoint image 104 is generated by the image processing system 1 based on the image data obtained by the image capturing apparatus 100 and the virtual viewpoint information 103. The virtual viewpoint image 104 is generated using, for example, the following method. A foreground image and a background image are obtained by extracting a foreground region corresponding to a predetermined object, such as a person and a ball, and a background region other than the foreground region from multiple viewpoint images obtained, respectively, by capturing images from different directions by the plurality of the image capturing apparatuses 100. A foreground model representing a three-dimensional shape of the predetermined object and texture data for coloring the foreground model are generated based on the foreground image. Texture data for coloring a background model representing a three-dimensional shape of a background, such as a stadium, is generated based on the background image. The texture data is then mapped with respect to the foreground model and the background model, and rendering is performed according to the virtual viewpoint indicated by the virtual viewpoint information 103, and thereby the virtual viewpoint image 104 is generated. However, the generation method of the virtual viewpoint image 104 is not limited to the above-described procedure, and various methods can be used, such as a method for generating the virtual viewpoint image 104 by performing projective transformation on a captured image without using a three-dimensional model. The image processing system 1 may externally obtain the virtual viewpoint image 104.

The configuration of the image processing system 1 is not limited to the example illustrated in FIG. 1. For example, the image processing apparatus 110 and the information processing apparatus 200 may be integrally configured. Alternatively, the field-of-view information 102, the virtual viewpoint information 103, and the virtual viewpoint image 104 may be generated by the information processing apparatus 200. Alternatively, the information generated by the information generating unit 205 and the virtual viewpoint image 104 may be combined and output to the display apparatus 300. The image processing system 1 includes a storage unit that stores the object information 101, the field-of-view information 102, the virtual viewpoint information 103, and the virtual viewpoint image 104, and an input unit that receives a user operation.

[Hardware Configuration]

Figure 2:
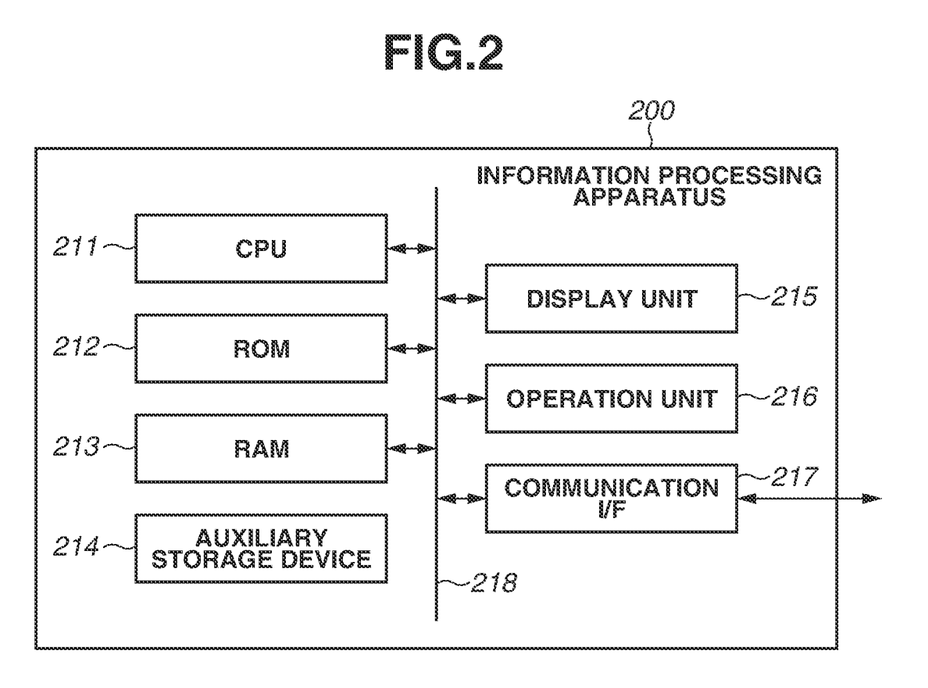
FIG. 2 illustrates an example of a hardware configuration of an information processing apparatus.

FIG. 2 illustrates an example of a hardware configuration of the information processing apparatus 200. Hardware configurations of the image processing apparatus 110 and the display apparatus 300 are similar to the configuration of the information processing apparatus 200 described below. The information processing apparatus 200 includes a central processing unit (CPU) 211, a read-only memory (ROM) 212, a random access memory (RAM) 213, an auxiliary storage device 214, a display unit 215, an operation unit 216, a communication interface (I/F) 217, and a bus 218.

The CPU 211 controls the entire information processing apparatus 200 using a computer program and data stored in the ROM 212 and the RAM 213, thereby realizing each function of the information processing apparatus 200 illustrated in FIG. 1. The information processing apparatus 200 may include one or more pieces of dedicated hardware different from the CPU 211, and the dedicated hardware may execute at least a part of processing executed by the CPU 211. Examples of the dedicated hardware include an application specific integrated circuit (ASIC), a field-programmable gate array (FPGA), and a digital signal processor (DSP). The ROM 212 stores, for example, a program that does not require a change. The RAM 213 temporarily stores, for example, a program and data supplied from the auxiliary storage device 214, and data supplied from the outside via the communication I/F 217. The auxiliary storage device 214 includes, for example, a hard disk drive and stores various types of data, such as image data and audio data.

The display unit 215 includes, for example, a liquid crystal display and a light-emitting diode (LED) and displays, for example, a graphical user interface (GUI) for a user to operate the information processing apparatus 200. The operation unit 216 includes, for example, a keyboard, a mouse, a joy stick, and a touch panel and inputs various instructions to the CPU 211 upon receiving a user operation. The CPU 211 operates as a display control unit for controlling the display unit 215 and as an operation control unit for controlling the operation unit 216. The communication I/F 217 is used for communication between the information processing apparatus 200 and an external apparatus. For example, in a case where the information processing apparatus 200 is connected to the external apparatus by wire, a communication cable is connected to the communication I/F 217. In a case where the information processing apparatus 200 has a function of wirelessly communicating with the external apparatus, the communication I/F 217 includes an antenna. The bus 218 connects units included in the information processing apparatus 200 with each other and transmits information thereto. According to the present exemplary embodiment, the display unit 215 and the operation unit 216 exist in the information processing apparatus 200. Alternatively, at least one of the display unit 215 and the operation unit 216 may exist as a separate apparatus on an outside of the information processing apparatus 200.

[Operation Flow]

Figure 3A:
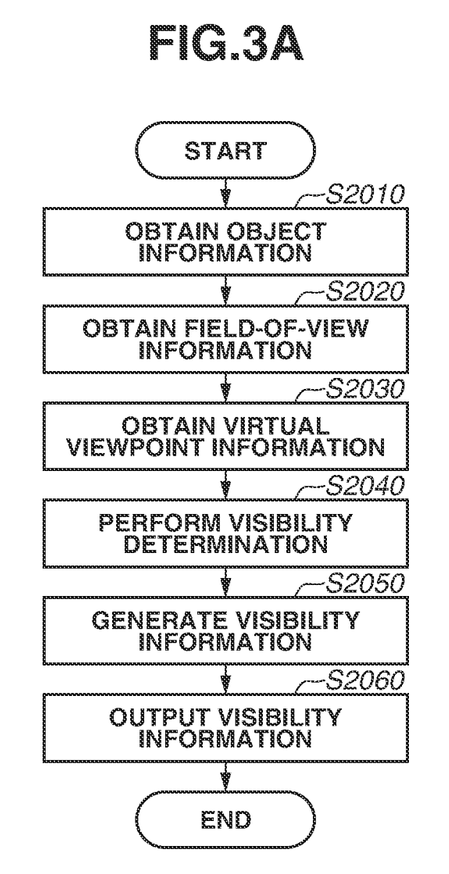
FIGS. 3A and 3B are flowcharts illustrating an example of operations of the information processing apparatus and a display apparatus.

FIG. 3A is a flowchart illustrating an example of operations of the information processing apparatus 200. Processing illustrated in FIG. 3A is realized by the CPU 211 included in the information processing apparatus 200 loading a program stored in the ROM 212 to the RAM 213 and executing the program. At least a part of the processing illustrated in FIG. 3A may be realized by one or more pieces of the dedicated hardware different from the CPU 211. The same applies to processing performed by a flowchart illustrated in FIG. 6 described below. The processing illustrated in FIG. 3A is started at a timing at which an instruction for generating information regarding visibility determination is input to the information processing apparatus 200. However, the timing for starting the processing illustrated in FIG. 3A is not limited to the above described timing. In a case where the virtual viewpoint image is a moving image, the processing illustrated in FIG. 3A may be executed for each frame included in the moving image of the virtual viewpoint image.

In step S2010, the object information obtaining unit 201 obtains the object information 101. In step S2020, the field-of-view information obtaining unit 202 obtains the field-of-view information 102. In step S2030, the virtual viewpoint obtaining unit 203 obtains the virtual viewpoint information 103. An order of the processing from steps S2010 to S2030 is not limited to the above-described order, and at least a part of the processing may be executed in parallel. In step S2040, the visibility determination unit 204 performs visibility determination. Details of the visibility determination will be described with reference to FIGS. 4A and 4B.

Figure 4A:
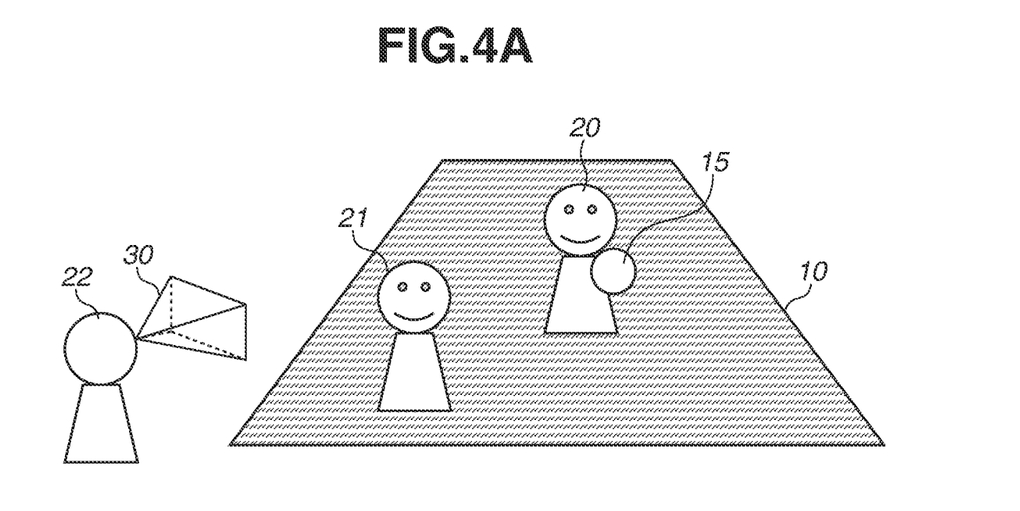
FIGS. 4A and 4B illustrate processing for visibility determination.

FIG. 4A illustrates a situation in which two players 20 and 21 exist in a field 10 in the image capturing region, and a ball 15 is located near a left hand of the player 20. Positions and shapes of the players 20 and 21 and the ball 15 are represented by the object information 101. In examples illustrated in FIGS. 4A and 4B, the field-of-view information 102 is specified to correspond to a field of view of a referee 22 who watches the player 20 from a position that is within the image capturing region and on an outside of the field 10. A quadrangular pyramid 30 indicates a position, a direction, and an angle (an angle range) of the field-of-view of the viewpoint of the referee 22.

Figure 4B:
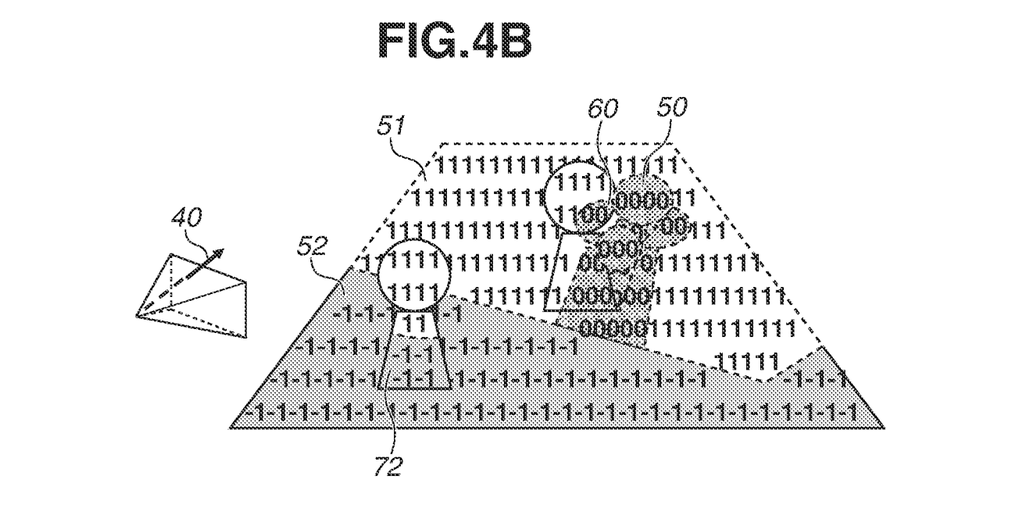

FIG. 4B illustrates a result of the visibility determination. In FIG. 4B, a visible region 51 to which flags "1" are attached is a region that can be seen from the viewpoint corresponding to the field-of-view information 102. An out-of-range region 52 to which flags "−1" are attached is a region that cannot be seen from the viewpoint corresponding to the field-of-view information 102. This is because the region is located at a position out of the angle of the field of view corresponding to the field-of-view information 102. An occluded region 50 to which flags "0" are attached is a region that is located in the angle of the field of view corresponding to the field-of-view information 102 but cannot be seen by being occluded by the player 21. A region combining the above-described out-of-range region 52 and occluded region 50 is an invisible region that cannot be seen from the viewpoint corresponding to the field-of-view information 102. The occluded region 50 includes a region 60 on the region corresponding to the player 20 occluded by the player 21. The out-of-range region 52 includes a region 72 on the region corresponding to the player 21 that is deviated from the angle of the field of view corresponding to the field-of-view information 102.

The visibility determination is performed, for example, as follows. In the visibility determination processing, a virtual light beam 40 is emitted from the position of the viewpoint corresponding to the field-of-view information 102 in each direction in the angle of view. The light beam 40 is emitted in a direction of each pixel in a case where a bottom surface of the quadrangular pyramid 30 is regarded as an image of 1920*1080 pixels. The flag "1" is attached to a surface of the object that is first hit (intersected) with the light beam 40, and the flag "0" is attached to the surface of the object that is hit with the light beam 40 for the second and subsequent times. The flag "−1" is attached to the surface of the object that is located on the outside of the angle of view and is never hit with the light beam 40. In a case where the near plane and the far plane of the field of view are specified by the field-of-view information 102, the flag "−1" is attached if a distance between the position of the viewpoint and a position at which the light beam hits the object is closer than the near plane or farther than the far plane.

The method of the visibility determination is not limited to the above-described processing. The visibility determination may be performed based on the field-of-view information 102 and the object information 101. For example, the method for emitting the light beam 40 is not limited to the above-described processing, and the light beam 40 may be emitted at every predetermined angle in the angle of view. The flag may be attached to each mesh constructing a three-dimensional model of the object, or may be attached to each pixel of a texture to be mapped to the three-dimensional model. Alternatively, three-dimensional coordinate values (x, y, and z) of an intersection point of the light beam 40 and the surface of the object and a flag value may be stored in association with each other. For example, the flag value may be determined using a result of determining occlusion using a depth buffer. Specifically, a distance is calculated from the intersection point of the light beam, which is emitted from the virtual viewpoint indicated by the virtual viewpoint information 103, and the object surface to the position of the viewpoint indicated by the field-of-view information 102. The distance is then compared with a depth value corresponding to the viewpoint indicated by the field-of-view information 102, and thereby occlusion may be determined.

In step S2050, the information generating unit 205 generates visibility information corresponding to a result of the visibility determination. As an example of the visibility information, a case is described in which a flag image is generated. The flag image is created by projecting the flag attached to each position on the object to the virtual viewpoint indicated by the virtual viewpoint information 103, and by replacing the flag value of each position viewed from the virtual viewpoint with a predetermined luminance value. For example, flag values "1", "0", and "−1" are replaced with luminance values "0", "50", and "100", respectively. The luminance value corresponding to the flag value "−1" and the luminance value corresponding to the flag value "0" may be allocated the same value. In this case, the out-of-range region 52 and the occluded region 50 are not discriminated in the flag image. In step S2060, the information generating unit 205 outputs the visibility information (flag image) to the display apparatus 300.

Figure 3B:
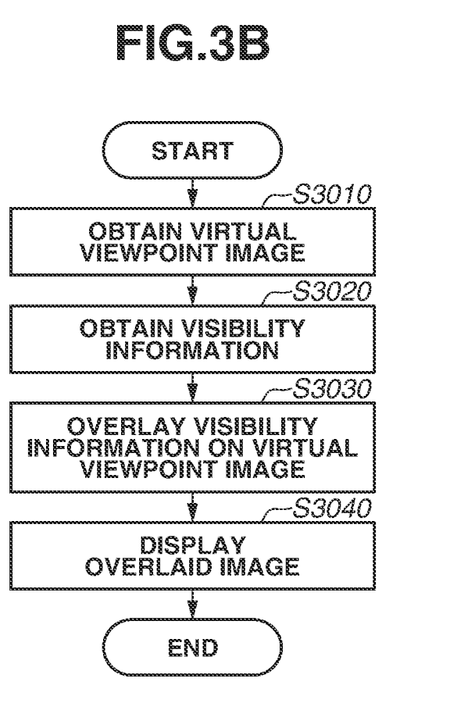

FIG. 3B is a flowchart illustrating an example of operations of the display apparatus 300. Processing illustrated in FIG. 3B is realized by the CPU 211 in the display apparatus 300 loading a program stored in the ROM 212 to the RAM 213 and executing the program. At least a part of the processing illustrated in FIG. 3B may be realized by one or more pieces of dedicated hardware different from the CPU 211. The processing illustrated in FIG. 3B is started at a timing at which the information processing apparatus 200 and the display apparatus 300 are connected and thereby enabled to communicate with each other. However, the timing for starting the processing illustrated in FIG. 3B is not limited to the timing. In a case where the virtual viewpoint image is a moving image, the processing in FIG. 3B may be executed for each frame included in the moving image of the virtual viewpoint image.

In step S3010, the display apparatus 300 obtains the virtual viewpoint image 104. The virtual viewpoint image 104 obtained in step S3010 is an image corresponding to the virtual viewpoint used by the information processing apparatus 200 for generating the visibility information. In step S3020, the display apparatus 300 obtains the visibility information output from the information processing apparatus 200. An order of the processing illustrated in steps S3010 and S3020 is not limited to the above-described order, and at least a part of the processing may be executed in parallel.

In step S3030, the display apparatus 300 overlays the flag image obtained from the information processing apparatus 200 on the virtual viewpoint image 104. The display apparatus 300 may obtain the field-of-view information 102 used by the information processing apparatus 200 at the time of generating the visibility information, and overlay a CG representing the viewpoint corresponding to the field-of-view information 102 on the virtual viewpoint image 104.

Figure 5A:
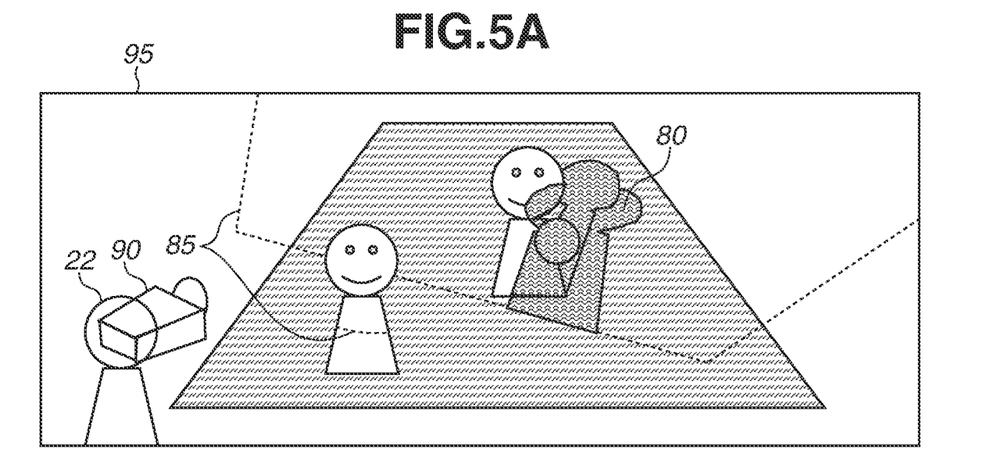
FIGS. 5A and 5B illustrate an example of visibility information.

FIG. 5A illustrates an overlaid image 95 a new virtual viewpoint image generated by overlaying the flag image and the CG corresponding to the field-of-view information 102 on the virtual viewpoint image 104 (an overlay display). The flag image is translucently overlaid, and an occluded region 80 corresponding to the flag "0" is covered with a predetermined translucent color (e.g., red) in the overlaid image 95. A camera model 90 in the overlaid image 95 represents the position of the viewpoint (the viewpoint of the referee 22) corresponding to the field-of-view information 102, and a boundary 85 represents an angle edge of the field of view corresponding to the field-of-view information 102.

The method for expressing the result of the visibility determination is not limited to the above-described one. A luminance value and color of the occluded region in the virtual viewpoint image, contrast, and the rendering method of the texture may be changed, or a boundary of the occluded region may be displayed. According to the example in FIG. 5A, the occluded region 80 and other regions can be discriminated by processing a portion corresponding to the occluded region 80 in the virtual viewpoint image. However, the display method of the visibility information is not limited thereto. For example, the visible region in the virtual viewpoint image may be processed (an image for covering the visible region is overlaid), or an out-of-range region may be processed. Two or more of the visible region, the outof-range region, and the occluded region may be processed respectively in different aspects so that these regions can be discriminated from each other. To distinguishably indicate the invisible region including the out-of-range region and the occluded region, the entire invisible region may be uniformly processed (an image covering the invisible region is overlaid).

Figure 5B:
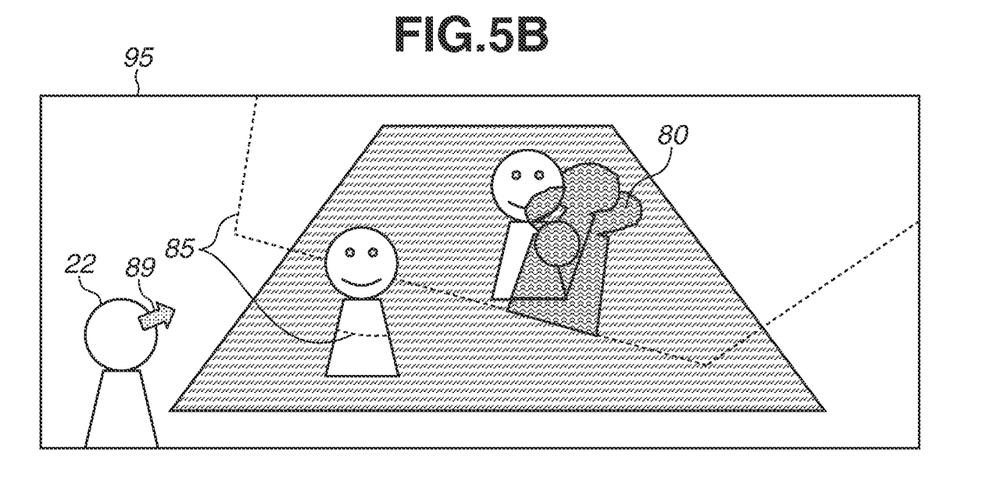

As illustrated in FIG. 5B, an arrow icon 89 indicating the position and the direction of the viewpoint corresponding to the field-of-view information 102 may be displayed in the virtual viewpoint image instead of the camera model 90. According to the present exemplary embodiment, the image processing system 1 obtains the virtual viewpoint image 104 in which the visibility information is not displayed, and displays the visibility information by overlaying on the virtual viewpoint image 104. Alternatively, the image processing system 1 may directly generate the virtual viewpoint image in which the visibility information is displayed based on the image data obtained by the image capturing apparatus 100, the virtual viewpoint information 103, and the visibility information, without obtaining the virtual viewpoint image 104 in which the visibility information is not displayed.

As described above, a viewer of the virtual viewpoint image can easily confirm a blind spot of the referee 22 by identifying a region which cannot be seen from the viewpoint, i.e., a blind spot, of the referee 22 and displaying the blind spot in a discriminable manner on the virtual viewpoint image seen from a bird's-eye view. For example, the viewer can easily recognize that the ball 15 and a part of the player 20 are hidden in the blind spot of the referee 22 by looking at the overlaid image 95 illustrated in FIG. 5B.

According to the above-described example, visibility from the viewpoint of the referee 22 is determined on the assumption that the field-of-view information 102 represents the field of view of the referee 22. However, the field-of-view information 102 is not limited thereto. For example, visibility of each region from the viewpoint of the player 21 can be discriminated by specifying the field-of-view information 102 to correspond to the field of view of the player 21. Further, the field-of-view information 102 is specified to set a position at which a player does not exist as the position of the viewpoint, so that it can be discriminated that which region can be seen in a case where a player exists at the position.

In addition, for example, the position of the viewpoint indicated by the field-of-view information 102 may be specified as a position of the ball 15, so that it can be easily discriminated that which region can be seen from the position of the ball 15, in other words, from which region the ball 15 can be seen. If the position of the viewpoint indicated by the field-of-view information 102 is specified as, for example, a goal instead of the ball 15, it can be discriminated that from which region the goal can be seen. The field-of-view information 102 may not include information indicating the line-of-sight direction and the size of the field of view. In other words, the field of view may include all directions viewed from the position of the viewpoint.

[Another Example of Visibility Information]

The example described above with reference to FIGS. 4A, 4B, 5A, and 5B is in a case where the visibility information corresponding to the result of the visibility determination output from the information processing apparatus 200 is the information indicating the visible region and the invisible region in the image capturing region in a discriminable manner. Another example of the visibility information will now be described.

Figure 6:
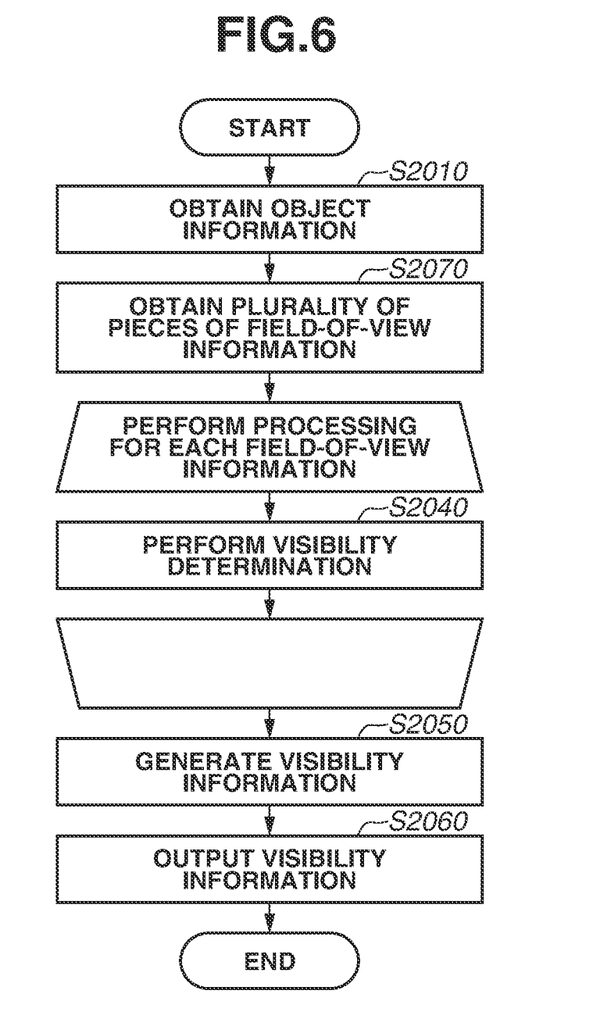
FIG. 6 is a flowchart illustrating an example of operations of the information processing apparatus.

First, a case is described in which a comparison result of visibility at a plurality of viewpoints is used as the visibility information. In this case, the information processing apparatus 200 executes a processing flow illustrated in FIG. 6 instead of the processing flow illustrated in FIG. 3A. The processing illustrated in FIG. 6 is started at a timing similar to that of the processing illustrated in FIG. 3A.

In step S2010, the object information obtaining unit 201 obtains the object information 101. In step S2070, the field-of-view information obtaining unit 202 obtains a plurality of pieces of the field-of-view information 102. The plurality of pieces of the field-of-view information 102 is different from each other in at least one of the position and the direction of the viewpoint and the angle of the field of view. In this case, the positions of the viewpoints indicated by the plurality of pieces of the field-of-view information 102 are different, and the following information is obtained: field-of-view information 102 representing the field of view of the referee 22, and pieces of the field-of-view information 102 representing four viewpoints each corresponding to five meter to front, back, left, and right parallelly shifted from the position of the viewpoint of the referee 22. However, the number of pieces of the field-of-view information 102 to be obtained and relationships among the respective pieces of the field-of-view information 102 are not limited to the above-described one.

In step S2040, the visibility determination unit 204 performs visibility determination on each field-of-view information 102 and calculates an area of the occluded region for each field-of-view information 102. The area of the occluded region can be calculated by adding up an area of the mesh attached with the flag "0" in the meshes constructing the object.

In step S2050, the information generating unit 205 generates the visibility information corresponding to the result of the visibility determination. Specifically, the information generating unit 205 generates the flag image indicating the occluded region corresponding to each of the plurality of pieces of the field-of-view information 102. Further, the information generating unit 205 generates information indicating a result of sorting (ranking) the plurality of pieces of the field-of-view information 102 based on the area of the occluded region calculated for each field-of-view information 102 by the visibility determination unit 204. Quick sort can be used as a sort algorithm, but another algorithm, such as bubble sort, may be used without being limited to the quick sort. In step S2060, the information generating unit 205 outputs the flag image and the information indicating a sorted result to the display apparatus 300 as the visibility information. The display apparatus 300 generates and displays the virtual viewpoint image on which the visibility information is overlaid using the processing described with reference to FIG. 3B.

Figure 7:
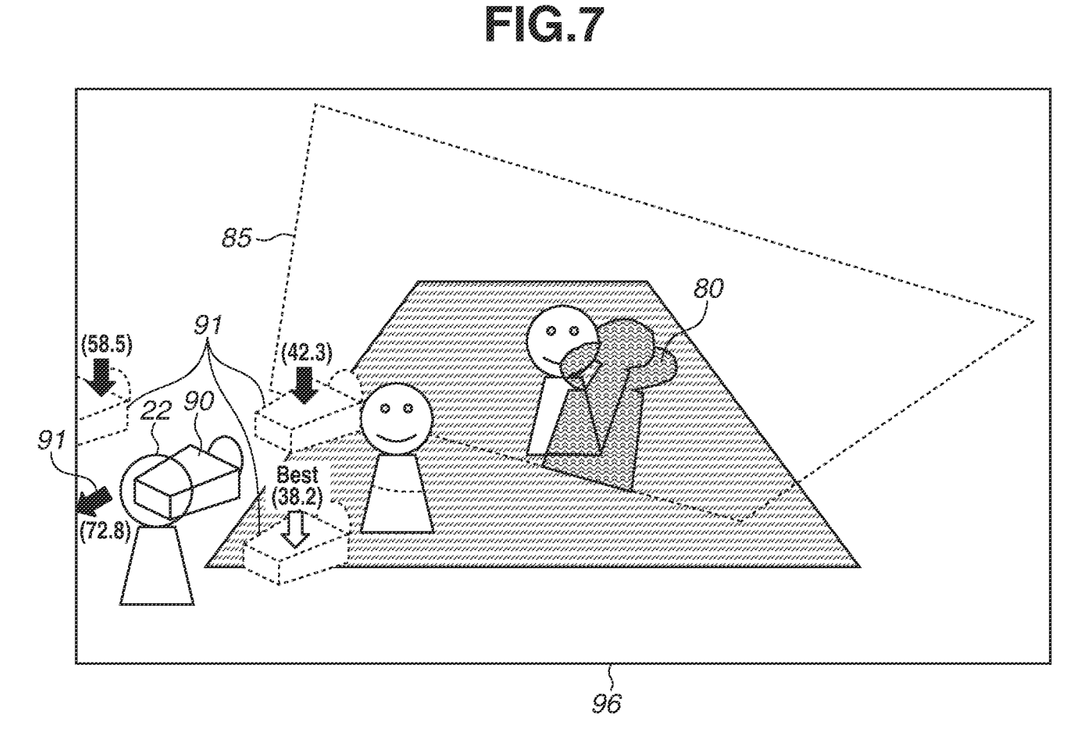
FIG. 7 illustrates an example of visibility information.

FIG. 7 illustrates an overlaid image 96 an example of the virtual viewpoint image on which the visibility information is overlaid. Icons 91 indicating four different viewpoints are displayed on the front, back, left, and right of the camera model 90 indicating the viewpoint of the referee 22. On each icon 91, a numerical value is displayed that indicates the area of the occluded region viewed from the respective viewpoint. The icon 91 corresponding to the viewpoint having the smallest area of the occluded region is highlighted (the color of the arrow is changed in the example in FIG. 7) together with letters of "Best". The method for emphasizing the icon 91 is not limited to this, and the rendering method of the icon 91 can be changed.

The viewpoint located on the back of the referee 22 is located out of a range of the overlaid image 96. Thus, the camera model corresponding to the viewpoint is not displayed, and only an arrow indicating a direction in which the viewpoint is located and the area of the occluded region are displayed. The occluded region 80 indicates an occluded region viewed from the viewpoint of the referee 22 as a reference. However, the occluded region corresponding to each of the plurality of viewpoints may be displayed in a discriminable manner. The occluded region having the smallest area may be displayed without being limited to the above-described one. The same applies to a display of the boundary 85.

As described above, the blind spots from a plurality of viewpoints in the vicinity of the referee 22 are identified, the viewpoint having the smaller blind spot is displayed, and thereby a viewer of the virtual viewpoint image can easily confirm to which position the referee 22 should move to make the blind spot small.

According to the above-described example, a display indicating the viewpoint having a small occluded region is performed. However, for example, a display for indicating an order of a size of the occluded region corresponding to each viewpoint and a display for indicating the viewpoint having a larger occluded region may be performed without being limited to the above-described example. A display for indicating the viewpoint having the occluded region of which the size is less than a threshold value may be performed, or conversely, a display for indicating the viewpoint having the occluded region of which the size is the threshold value or larger may be performed. According to the above-described example, a result of comparing the sizes of the occluded regions respectively corresponding to the plurality of viewpoints is displayed. However, a result of comparing sizes of the visible regions respectively corresponding to the plurality of viewpoints may be displayed, or a result of comparing sizes of the invisible regions respectively corresponding to the plurality of viewpoints may be displayed, without being limited to the above-described example.

According to the above-described example, the area is used as an index indicating the size of the region. However, a volume may be used as an index indicating the size of the region. In this case, the light beam 40 is emitted from the viewpoint indicated by the field-of-view information 102 to each voxel in the three-dimensional space associated with the image capturing region, and the flag "1" is attached to a voxel existing in a space until the light beam 40 first hits the object. A three-dimensional position attached with the flag "1" in the above-described manner is a position that can be seen from the viewpoint indicated by the field-of-view information 102. A volume of the visible region can be calculated by counting the number of the voxels attached with the flag "1". Volumes of the occluded region and the out-of-range region can also be calculated in the similar manner. In this case, the volume of the occluded region corresponding to each viewpoint may be displayed as a part of the visibility information in the overlaid image 96.

According to the above-described example, the plurality of viewpoints to be compared is located at equal intervals. Without being limited to the above-described example, however, for example, the plurality of pieces of the field-of-view information 102 respectively corresponding to viewpoints of a plurality of referees may be obtained, and these viewpoints may be compared with each other. It can thereby be confirmed which referee's viewpoint includes the smallest blind spot. The plurality of viewpoints to be compared may be arbitrarily specified based on a user operation.

Next, a case will be described in which information indicating visibility of a specific object viewed from a specified viewpoint is used as the visibility information. In this case, in step S2040 illustrated in FIG. 3A, the visibility determination unit 204 determines whether the specific object in the image capturing region can be seen from the viewpoint indicated by the field-of-view information 102. For example, it is assumed that the ball 15 is selected as the object to be a target of the visibility determination. The visibility determination unit 204 calculates a ratio of the meshes, which included in a plurality of meshes constructing the three-dimensional model of the ball 15, attached with the flag "1" indicating "visible" to the meshes attached with the flag "0" or "−1" indicating "invisible".

Figure 8:
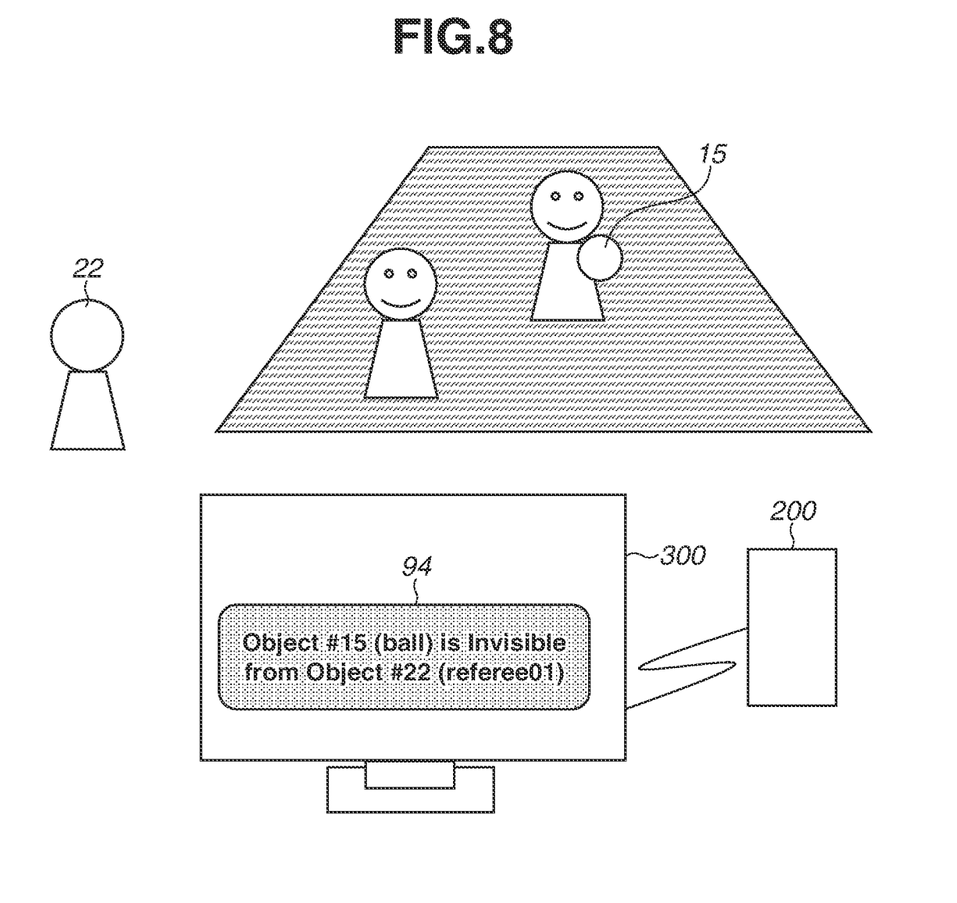
FIG. 8 illustrates an example of an output of visibility information.

In a case where the ratio of the flag "0" or "−1" exceeds a predetermined ratio, for example, 50 percent, the information generating unit 205 outputs information indicating that the ball 15 cannot be seen from the referee 22 to the display apparatus 300 as the visibility information. The above-described predetermined ratio may be set based on a user operation with respect to the information processing apparatus 200 or may be a ratio corresponding to a parameter obtained from the outside of the information processing apparatus 200. FIG. 8 illustrates an example of a situation of the image capturing region and a display on the display apparatus 300. In a case where the predetermined ratio or more of the meshes constructing the three-dimensional model of the ball 15 cannot be seen from the viewpoint of the referee 22 indicated by the field-of-view information 102, an icon 94 indicating the result of the visibility determination is displayed on the display apparatus 300 as the visibility information. The icon 94 may be displayed overlaid on the virtual viewpoint image.

As described above, a viewer of the virtual viewpoint image can easily recognize that the ball 15 cannot be seen from the referee 22, by specifying the blind spot from the viewpoint of the referee 22 and displaying to indicate whether the ball 15 is in the blind spot (whether the ball 15 is located in the invisible region)

According to the above-described example, the visibility information is displayed in a case where the predetermined ratio or more of the part of the ball 15 cannot be seen from the viewpoint corresponding to the field-of-view information 102. Conversely, in a case where a predetermined ratio or more of the part of the ball 15 can be seen, the visibility information indicating the case may be displayed. In other words, the visibility information may be information indicating whether the ball 15 the specific object is located in the visible region. Further, different pieces of the visibility information may be displayed depending on a case where the ball 15 can be seen or not. Furthermore, different pieces of the visibility information may be displayed depending on a case where the ball 15 is located in the occluded region or in the out-of-range region. According to the above-described example, the ball 15 is described as the object to be the target of the visibility determination. However, the object may be a specific player and a specific position in the image capturing region without being limited to the above-described example. The target of the visibility determination may be set based on a user operation received by the information processing apparatus 200, and there may be a plurality of objects to be the targets of the visibility determination.

The information processing apparatus 200 may determine visibility of a specific object viewed from a plurality of viewpoints respectively corresponding to the plurality of pieces of the field-of-view information 102. For example, the information processing apparatus 200 may determine whether the ball 15 can be seen from the respective viewpoints of the plurality of referees and display information indicating from which referee the ball 15 can be seen as the visibility information.

As described above with reference to a plurality of the examples, the image processing system 1 obtains the object information 101 representing a position and a shape of an object in the image capturing region captured from different directions by the plurality of the image capturing apparatuses 100. The image processing system 1 discriminates between the visible region that can be seen from a specific position in the image capturing region and the occluded region that cannot be seen from the specific position due to occlusion by the object based on the object information 101. The image processing system 1 generates the virtual viewpoint image on which information based on a result of the discrimination is displayed. The virtual viewpoint image is based on the image data based on image capturing by the plurality of the image capturing apparatuses 100 and the virtual viewpoint information 103 indicating the position and the direction of the virtual viewpoint. According to the above-described configuration, a region that can be seen from a specific position and a region that cannot be seen therefrom due to occlusion can be easily discriminated.

According to the above-described exemplary embodiment, a case is mainly described in which the visibility information indicating whether each region in the image capturing region can be seen from the referee 22 is generated based on the field-of-view information 102 regarding the viewpoint corresponding to the referee 22 and the object information 101. However, for example, the information processing apparatus 200 may obtain pieces of the field-of-view information 102 respectively corresponding to a left eye and a right eye of the referee 22, and generate the visibility information indicating a region which can be seen only by the left eye, a region which can be seen only by the right eye, and a region which can be seen by both eyes in a discriminable manner. The field-of-view information 102 may include not only information regarding the position and the direction of the viewpoint and the size of the field of view but also information regarding eyesight of a person (e.g., the referee 22) or information regarding an environment of the image capturing region (e.g., information regarding weather, brightness, and a position of a light source). The information processing apparatus 200 may generate the visibility information indicating a region that can be clearly seen from a specific viewpoint and a region that cannot be clearly seen therefrom in a discriminable manner using the above-described field-of-view information 102. According to the above-described configuration, visibility from a specific viewpoint in a certain scene can be verified in more detail.

According to the above-described exemplary embodiment, the example is described in which the information processing apparatus 200 outputs the result of the visibility determination from the viewpoint at a specific time. However, the information processing apparatus 200 may aggregate and output results of the visibility determination at a plurality of times at which the viewpoint changes. For example, an area and a volume of the invisible region at each time viewed from the viewpoint of the referee 22 who moves around may be plotted and output. Alternatively, a length of a period during which the area and the volume of the invisible region exceed a threshold value or the ball 15 enters the invisible region may be measured and output. The length of the period throughout one match can be used to score movements of the referee 22. Further, for example, information indicating an overlay portion of the visible region at a plurality of times (a region visible in any time) and an added portion of the invisible region (a region invisible at some time) may be output as the visibility information.

According to the present disclosure, a region that can be seen from a specific position and a region that cannot be seen therefrom due to occlusion can be easily discriminated.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2020-024926, filed Feb. 18, 2020, which is hereby incorporated by reference herein in its entirety.

What is claimed is:

1. An information processing apparatus comprising:
at least one memory that stores instructions; and
at least one processor that executes the instructions to:
obtain object information representing respective a positions and shapes of a plurality of objects in an image capturing region of which image is captured from different directions by a plurality of image capturing apparatuses;
a visible region that can be seen from a specific object included in the plurality of objects and an occluded region that cannot be seen from the specific object due to occlusion by the other objects included in the plurality of objects based on the obtained object information; and
generate a virtual viewpoint image that displays the visible region and the occluded region based on the virtual viewpoint image being based on image data based on image capturing by the plurality of image capturing apparatuses and virtual viewpoint information indicating a position and a direction of a virtual viewpoint.

2. The information processing apparatus according to claim 1, wherein the at least one processor further executes the instructions to obtain field-of-view information that relates to a viewpoint at the specific object, the field-of-view information indicating a position of the specific object as a position of the viewpoint, a line-of-sight direction from the position of the viewpoint, and a size of a field of view centered on the line-of-sight direction, and wherein the at least one processor determines the visible region in which the object does not exist between the position of the viewpoint and determines the occluded region in which the object exists between the position of the viewpoint in regions included in a range of the field of view specified by the obtained field-of-view information.

3. The information processing apparatus according to claim 1, wherein the visible region is included in a predetermined angle range viewed from the specific object, and wherein the at least one processor determines the region to the visible region and an out-of-range region not included in the predetermined angle range viewed from the specific object.

4. The information processing apparatus according to claim 3, wherein the virtual viewpoint image displays an invisible region that includes the occluded region and the out-of-range region.

5. The information processing apparatus according to claim 1, wherein the object information represents a three-dimensional position and a three-dimensional shape of the object.

6. A method for processing information, the method comprising:

obtaining object information representing respective positions and shapes of a plurality of objects in an image capturing region of which image is captured from different directions by a plurality of image capturing apparatuses;

determining a visible region that can be seen from a specific object included in the plurality of objects and an occluded region that cannot be seen from the specific object due to occlusion by the other objects included in the plurality of objects based on the obtained object information; and generating a virtual viewpoint image that displays the visible region and the occluded region based on the virtual viewpoint image being based on image data based on image capturing by the plurality of image capturing apparatuses and virtual viewpoint information indicating a position and a direction of a virtual viewpoint.

7. A non-transitory computer-readable storage medium storing a program for causing a computer to execute a method for processing information, the method comprising:

obtaining object information representing respective a positions and shapes of a plurality of objects in an image capturing region of which image is captured from different directions by a plurality of image capturing apparatuses;

determining a visible region that can be seen from a specific object included in the plurality of objects and an occluded region that cannot be seen from the specific object due to occlusion by the other objects included in the plurality of objects based on the obtained object information; and generating a virtual viewpoint image that displays the visible region and the occluded region based on the virtual viewpoint image being based on image data based on image capturing by the plurality of image capturing apparatuses and virtual viewpoint information indicating a position and a direction of a virtual viewpoint and displays information based on a result of the determining the region to discriminate.

* * * * *